United States Patent
Liu et al.

(10) Patent No.: US 12,382,854 B1
(45) Date of Patent: Aug. 12, 2025

(54) STRAW RETURNING METHOD THROUGH THAWING AND WET PUDDLING FOR SALINE-SODIC PADDY FIELDS AND APPLICATION THEREOF

(71) Applicant: Northeast Institute of Geography and Agroecology, Chinese Academy of Sciences, Changchun (CN)

(72) Inventors: Hongyuan Liu, Changchun (CN); Ren Geng, Nanjing (CN); Ding Wang, Shenyang (CN); Qingquan Xu, Daqing (CN); Yanhong Zhou, Changchun (CN); Xintong Liu, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/926,633

(22) Filed: Oct. 25, 2024

(30) Foreign Application Priority Data

Apr. 1, 2024 (CN) .......................... 202410382293.8

(51) Int. Cl.
| | | |
|---|---|---|
| *A01B 79/02* | (2006.01) | |
| *A01C 21/00* | (2006.01) | |
| *A01D 45/04* | (2006.01) | |
| *A01G 22/22* | (2018.01) | |

(52) U.S. Cl.
CPC ............. *A01B 79/02* (2013.01); *A01C 21/00* (2013.01); *A01C 21/005* (2013.01); *A01C 21/007* (2013.01); *A01D 45/04* (2013.01); *A01G 22/22* (2018.02)

(58) Field of Classification Search
CPC ...... A01B 79/02; A01G 22/22; A01C 21/005; A01C 21/007; A01C 21/00; A01D 45/04
See application file for complete search history.

(56) References Cited

FOREIGN PATENT DOCUMENTS

| | | | | |
|---|---|---|---|---|
| AU | 2021106554 A4 | 11/2021 | | |
| CN | 107484454 A | * | 12/2017 | ............. A01B 79/02 |
| CN | 110178671 A | | 8/2019 | |
| CN | 112889606 A | | 6/2021 | |
| CN | 113287385 A | * | 8/2021 | |
| CN | 113424675 A | * | 9/2021 | |
| CN | 114128433 A | | 3/2022 | |
| CN | 114830865 A | | 8/2022 | |
| CN | 114868612 A | | 8/2022 | |
| CN | 115336513 A | * | 11/2022 | |

(Continued)

OTHER PUBLICATIONS

Louisiana Delta Crop Videos, "2021 Market Updates and Outlooks for Rice", Feb. 1, 2021, Youtube (Year: 2021).*

(Continued)

*Primary Examiner* — Joseph M Rocca
*Assistant Examiner* — Ashley A Kaercher
(74) *Attorney, Agent, or Firm* — Pilloff Passino & Cosenza LLP; Rachel Pilloff; Sean Passino

(57) ABSTRACT

Provided are a straw returning method through thawing and wet puddling for saline-sodic paddy fields and an application thereof, relating to the technical field of returning straws to fields in saline-sodic paddy fields. According to the disclosure, regional characteristics are fully considered, "thawing" is taken as the core and combined with wet puddling.

1 Claim, 3 Drawing Sheets

(56) References Cited

FOREIGN PATENT DOCUMENTS

SU            1677055 A1     9/1991

OTHER PUBLICATIONS

ETHOS-Spirit of the Community, "The amazing engineering of the wet rice mountain people", May 17, 2020, Youtube (Year: 2020).*

Kirloskar Oil Engines, Puddling, https://www.kirloskaroilengines.com/products/farm-mechanization/puddling (Year: 2023).*

D. -G Kim, "Effects of soil rewetting and thawing on soil gas fluxes: a review of current literature and suggestions for future research ", 2012, Biogeosciences (Year: 2012).*

Desheng Yang, "Stubble height affects the grain yield of ratoon rice under rainfield conditions", 2022, Agricultural Water Management (Year: 2022).*

Haishan Yang, "Ditch-buried straw return: a novel tillage practice combined with tillage rotation and deep ploughing in rice-wheat rotation systems", 2019, Advances in Agronomy, vol. 154, pp. 257-290 (Year: 2019).*

Edited by JIAO Xinqiu, "Hongqiling farm records 1985-2000," pp. 201-207, Publication date: Apr. 30, 2009, Heilongjiang People's Publishing House. agency, Related pages: p. 201-202 (translated). Claims involved: 1-5.

Xu Ran, "Discussion on mechanization of stirring and soil preparation in paddy field," Friends of Farmers Becoming Rich, date of issue: Nov. 10, 2015, Related pages: p. 117, Issue 21. Claims involved: 1-5.

First Office Action for China Application No. 202410382293.8, mailed May 8, 2024.

Second Office Action for China Application No. 202410382293.8, mailed Jul. 3, 2024.

Third Office Action for China Application No. 202410382293.8, mailed Jul. 16, 2024.

Notification to Grant Patent for China Application No. 202410382293.8, mailed Aug. 1, 2024.

First Search Report for China Application No. 202410382293.8, dated May 6, 2024.

Supplementary Search Report for China Application No. 202410382293.8, dated Jul. 29, 2024.

* cited by examiner

STRAW RETURNING METHOD THROUGH THAWING AND WET PUDDLING FOR SALINE-SODIC PADDY FIELDS AND APPLICATION THEREOF

CROSS-REFERENCE TO RELATED APPLICATIONS

This application claims priority to Chinese Patent Application No. 202410382293.8, filed on Apr. 1, 2024, the contents of which are hereby incorporated by reference.

TECHNICAL FIELD

The disclosure relates to the technical field of straw returning in saline-sodic paddy fields, and in particular to a straw returning method through thawing and wet puddling for saline-sodic paddy fields and an application thereof.

BACKGROUND

Returning rice straw to field may fertilize paddy soil, and may avoid environmental pollution and soil structure damage caused by straw burning. At present, the technical methods of rice straw returning to the field mainly include returning technology through turning and burying, returning technology through rotary tillage, and puddling returning technology, and so on. However, these technical methods are only suitable for mild saline-sodic rice regions or non-saline-sodic rice regions, and the existing technical methods are difficult to apply to moderate and severe saline-sodic paddy fields traditionally referred to as "saline-sodic paddy fields" which are mainly distributed in the western Songnen plain.

In order to avoid the environmental pollution caused by straw burning and realize straw returning to the field, at present, the straw returning to the field by spring puddling technology is reluctantly adopted in saline-sodic rice regions. However, due to the unique obstacle conditions of saline-sodic soil and cold climate characteristics of the saline-sodic rice regions, there are outstanding problems in the application of conventional spring puddling straw returning technology. Firstly, the content of carbonate ions, bicarbonate ions and exchangeable sodium ions in saline-sodic paddy soils is high, and the texture is sticky and heavy, so the soil dispersion is extremely strong. After the application of conventional spring puddling straw returning technology, the cultivation layer (i.e., puddled soil layer) is too fine and has no aggregation structure, and the water permeability and air permeability are extremely poor, which not only inhibits the growth of rice seedlings, but also reduces the dissolution rate of salt in cultivation layer soil into the paddy water layer, thus increasing the salinity and alkalinity stress of soil on rice in disguised form. In addition, the gas exchange between cultivation layer soil and the atmosphere is also inhibited, resulting in low oxygen content in cultivation layer. The straw returned to the field strongly generates biogas, which poisons rice roots. Secondly, conventional spring puddling straw returning technology generally requires steeping and puddling operations from late April to early May (for example, a method of directly returning rice straw to field for cultivation in western part of Jilin Province, which is published by application number 202110128201.X). At this time, the 15 cm cultivation layer has been completely thawed. However, due to the strong dispersion of saline-sodic soil, although the depth of puddling operation is generally required to be 15 cm, when the 15 cm cultivation layer is completely thawed, the lower soil has also been partially thawed, and the heat transfer between water and soil accelerates the thawing of the soil layer below the cultivation layer. Therefore, during the puddling operation, the strength of the lower soil is not enough to support the rolling of the wheels of the operating vehicle, leading to the formation of deep ruts. Repeated rolling of wheels and the widespread occurrence of deep ruts lead to excessive puddling depth and excessive mud, resulting in poor quality of rice mechanical transplanting. Sinking of seedlings after transplantation due to insufficient soil support strongly inhibits subsequent rejuvenation and growth of seedlings, resulting in yield loss. In addition, the supporting force for the wheels in the process of mechanical transplanting mainly comes from the plough pan, and the deep ruts left behind cause the plough pan to fluctuate, thus increasing the difficulty of transplanting, reducing the quality of transplanting, further inhibiting the growth of seedlings and causing yield loss. Thirdly, the climate in the saline-sodic rice regions in the western Songnen plain is cold, and the straw in the field will not decompose obviously after a long winter. It is necessary to provide water in time to accelerate decomposition of the straw returning to the field after warming up in the spring, while the conventional spring puddling straw returning technology only carries out steeping field from late April to early May. Although this process supplements water for straw decomposition, the late water supply time determines that the left time for straw decomposition before rice transplanting is very short, which leads to the straw decomposition process concentrated after rice transplanting. The generated biogas poisons rice roots and negatively affects rice growth and yield.

To sum up, in order to explore a technical straw returning method for saline-sodic paddy fields in the western Songnen plain, the regional characteristics such as poor soil structure and permeability in the cultivation layer caused by saline-sodic obstacles, too deep mud layer easily caused by conventional puddling operation, and slow straw decomposition caused by cold climate should be fully considered. Based on the above analysis, combined with practical experience, there is a need to put forward a new straw returning method through thawing and wet puddling for saline-sodic paddy fields.

SUMMARY

An objective of the disclosure is to provide a straw returning method through thawing and wet puddling for saline-sodic paddy fields and an application thereof, so as to solve the problems existing in the prior art.

To achieve the above objective, the disclosure provides a following scheme.

The disclosure provides a straw returning method through thawing and wet puddling for saline-sodic paddy fields in western Songnen plain, including following steps:
  S1: harvesting rice with high stubble left, crushing and scattering straw: when harvesting the rice, leaving the high stubble under a condition of ensuring full harvest of rice ears, and scattering crushed straw on the ground;
  S2: ploughing: ploughing at a surface depth of 14-16 centimeters (cm);
  S3: fertilizing;
  S4: irrigating for thawing: from late March to early to mid April, irrigating for thawing in the rice field to make a whole thawed depth of a soil layer reach 11-13 cm;

S5: carrying out wet puddling operation: carrying out the wet puddling operation, where an operation depth is 11-13 cm; and S6: drying.

Optionally, a rice stubble height is 30-40 cm.

Optionally, an average length of crushed straw after the crushing is ≤15 cm, and a qualified rate of straw crushing lengths is ≥80 percent (%), and uniformity of straw scattering is ≥80%.

Optionally, a leakage rate of ploughing is ≤5% and a re-ploughing rate is ≤5%.

Optionally, a drying duration is not less than 20 days, and a soil drying depth after the drying is not less than 10 cm.

Optionally, fertilizers applied in a fertilizing step include base fertilizer and urea.

In the disclosure, a fertilization time is before the irrigating for thawing, and a more preferable fertilization time is in the middle and late March.

Optionally, the field is irrigated during the irrigating for thawing until tops of slices are submerged, and the field is steeped for 1-2 hours.

Optionally, the irrigating for thawing is carried out by means of stringing water in the field.

Optionally, before freezing in the autumn, a water outlet corresponding to a ridge position is excavated for the irrigating for thawing.

The specific steps of the straw returning method through thawing and wet puddling are as follows.

S101: harvesting rice with high stubble left, crushing and scattering straw: rice harvesting is carried out by using a full-feeding harvester combined with crushing and scattering devices, and the stubble is left as high as possible on the premise of ensuring full harvest of rice ears. According to the application experience, the stubble height under the condition of not lodging may generally reach about 40 cm (more preferably 30-40 cm); the average length of crushed straw is ≤15 cm, and the qualified rate of the straw crushing length is ≥80%. After crushing, the straw is evenly scattered on the ground, and the scattering uniformity is ≥80%. Leaving high stubble may promote straw mixing into the soil and reduce straw floating in the puddling process. The mechanism is that the rice stubble is connected with the soil through the root system, and this connection restricts the integration of the rice stubble and the soil. Therefore, in the subsequent shallow ploughing operation, compared with the scattered straw, the stubble straw is more likely to be buried in the soil when the rice stubble is overturned along with the soil blocks. In addition, in the subsequent puddling operation, the rice stubble bound by the soil blocks does not easily float.

S102: shallow ploughing: a tractor with a driving disk plough with a power of over 90 horsepower is used for shallow ploughing, with a depth of 14-16 cm, a leakage ploughing rate of ≤5% and a re-ploughing rate of ≤5%. The salt accumulation in the topsoil from autumn to the following spring is one of the important characteristics that distinguishes saline-sodic paddy fields from ordinary paddy fields. The basic principle is that soluble salts in deep soil move upward with water through soil capillary pores and accumulate, leading to the intensification of salinization in cultivation layer soil. Shallow ploughing breaks the soil capillary pores, inhibits salt accumulation, and is beneficial to the oxidation and reduction of reducible harmful substances in soil, and promotes the maturation of cultivation layer soil. The driving disk plough may effectively press the straw into the soil, and avoid the straw from being entangled around the plough or piled up. The depth of shallow ploughing is 14-16 cm, which is consistent with the cultivation layer depth of the saline-sodic paddy field, so the problem of deep soil structure damage will not be caused.

S103: excavating a water outlet at a ridge: before freezing in the autumn, the water outlet with a width of about 50 cm is excavated at a ridge position corresponding to a low position where water easily flows between two adjacent fields, and the depth is at a same level with a field surface, and excavated soil is piled on the ridge near the water outlet for later closure of the water outlet. The significance of excavating the water outlet before freezing is that the soil is easy to be excavated at this time, otherwise it will be very difficult to excavate the frozen ridge when "S106: irrigating for thawing" is carried out in the next year.

S104: application of base fertilizer and quick-acting nitrogen fertilizer: before the irrigating for thawing, base fertilizer is applied according to local production experience, and at the same time additional urea is applied of 75-150 kilogram/hectare (kg/ha), so as to adjust the carbon-nitrogen ratio suitable for microbial activities and promote straw decomposition.

S105: closure of the water outlet of the ridge: loose soil thawed on the surface near the water outlet of the ridge is excavated, and the water outlet is closed to control the water of "S106: irrigating for thawing" to stay in the required field.

S106: irrigating for thawing: from late March to early to mid April, when a natural thawed depth of the soil layer reaches 6-8 cm, the field is irrigated, and the irrigation is stopped until the tops of the slices are submerged, and the field is steeped for 1-2 hours. Through the heat exchange between soil and water, the shallow ploughed slice is further thawed, and the overall thawed depth reaches 11-13 cm, and at the same time, a large number of frozen soil blocks are retained.

S107: stringing water: the water outlet of the field closed in "S105: closure of the water outlet of the ridge" is dug, so that the open water in the field is stringed into the next field, and when an open water area accounts for not more than 20% of a field surface area, the water outlet is closed again to stop stringing water, and meanwhile, water is diverted from the water source to irrigate and thaw the next field. Stringing water rather than directly draining the open water from the field may save water resources and improve the utilization efficiency. It should be noted that due to the cold climate and low temperature at night in the western Songnen plain from late March to early to mid April, if this field is the last field planned to be operated on that day, the water of this field should not be stringed into the next field, but should be directly discharged to the ditch through the water outlet, otherwise the low temperature at night may cause the water stringed into the next field to freeze into a whole with the soil in the field, which seriously hinders the next day's operation, that is, the plot must not retain water overnight.

S108: wet puddling, leveling, and drainage: after the field is irrigated and thawed, a tractor with a puddling machine of not less than 90 horsepower is immediately used for the wet puddling, and the depth of puddling operation is set to 11-13 cm, which is consistent with the depth of the thawed layer. At this time, the lower soil is in a frozen state, which may well support the operating machinery, and the tractor wheels only roll the frozen soil at a depth of 2-3 cm. Tractor wheels only make ruts with a depth of 2-3 cm when rolling the frozen soil in the lower layer, and the ruts are repeatedly rolled to form a mud layer with a depth of 2-3 cm, which is matched with 11-13 cm of puddling by the puddling machine to form a cultivation layer with a depth of about 15 cm. The tractor is also equipped with a leveler to even the field surface, and the field surface is observed until the straw is not obviously exposed and the height difference is not more than ⅓ decimetre, then the mechanical operation is stopped, and the drainage outlet normally matched with the field is opened to discharge the muddy water on the field surface into the drainage ditch. At this time, the cultivation layer includes mud, frozen soil blocks of different sizes and straw and so on. Wet puddling may avoid the problem of straw floating, which is different from conventional water puddling. The large operating range of the leveler makes it easy to realize field surface leveling.

S109: drying to promote structure formation of cultivation layer soil: the field with muddy water drained is dried. On the one hand, the frozen soil blocks gradually thaw and dry along with the cultivation layer, and the frozen soil blocks retain the internal pore structures, and the frozen soil blocks are staggered, promoting the formation of soil pores distributed in the cultivation layer. On the other hand, water supply and temperature increase promote the straw decomposition. The drying duration is not less than 20 days. At this time, criss-crossing cracks appear on the field surface, and the drying depth of cultivation layer soil from the surface is not less than 10 cm. The aggregates of cultivation layer soil are increased, the pore structure is improved and the supporting force is enhanced. The improvement of water permeability of cultivation layer soil may promote the dissolution of salts in soil into water, thus accelerating the salt discharge of soil. The improvement of the permeability of cultivation layer soil may promote the gas exchange between the soil and atmosphere, thus inhibiting the biogas generation and accelerating the discharge of harmful gases. The enhancement of the supporting force of the cultivation layer soil may improve the quality of mechanical transplanting, thus promoting the growth of rice seedlings and increasing yield.

The disclosure also provides an application of the straw returning method through thawing and wet puddling for saline-sodic paddy fields in the straw returning of the saline-sodic paddy fields in the western Songnen plain.

The straw returning method through thawing and wet puddling for saline-sodic paddy fields according to the disclosure fully considers the regional characteristics such as poor structure and permeability of cultivation layer soil caused by saline-sodic obstacles, too deep mud layer caused by conventional puddling operation, and slow straw decomposition caused by cold climate, and on the basis of realizing initial straw burying and inhibiting saline-sodic surface aggregation by harvesting rice with high stubble left and shallow ploughing in the autumn, the method realizes the total straw returning to the field by taking "thawing" as the core and combining with wet puddling. The specific beneficial effects are as follows.

Through the heat exchange between irrigatied water and frozen soil, "thawing" is carried out, artificially realizing the unity of two phenomena that should have occurred in different time periods, namely, the thawing and puddling of cultivation layer soil and the keeping of the lower soil frozen to support wheel rolling. On the premise of ensuring the standard cultivation layer depth of about 15 cm, the puddling machine may be allowed to carry out fine puddling operation, so that the whole amount of straw may be evenly mixed into the cultivation layer soil and the high quality of straw returning to the field may be realized.

After "thawing", a plough pan formed by wet puddling is smooth, which may greatly lower the difficulty of mechanical transplanting, reduce missing transplants, solve the problem of "uneven spatial distribution" of transplanted seedlings, and achieve neat seedling rows.

The drying promotes the structure formation of the cultivation layer soil, and the seedlings may keep their original positions stably after being transplanted, thus solving the problem, which inhibits the seedling growth and reducing the yield, that the transplanted seedlings sink or deviate due to the soft cultivation layer and mud after conventional spring puddling in saline-sodic paddy fields.

After thawing and puddling, a large number of frozen soil blocks remain in the cultivation layer, and the internal pores of frozen soil blocks and the external pores formed by the staggered distribution of frozen soil blocks significantly improve the air permeability and water permeability of cultivation layer soil. The improvement of water permeability is beneficial to the salt discharge of cultivation layer soil, and the improvement of air permeability is beneficial to the gas exchange between soil and atmosphere, which inhibits the biogas generation and is beneficial to the discharge of toxic gases. Moreover, the frozen soil blocks sink in the puddling process, promoting the formation of a standard cultivation layer structure of paddy field with the upper layer of soil-water fused and soft and the lower layer of soil loose and breathable (commonly known as "upper paste and lower loose").

The suitable operation time of conventional spring puddling is from late April to early May, while the suitable operation time of thawing and wet puddling in the disclosure is from late March to early to mid April. The thawing and wet puddling advance the spring ploughing operation time by about one month, which is of great significance to agricultural areas with vast land and sparse population, and to future agriculture with rapidly decreasing working-age labor force.

The early operation of thawing and wet puddling provides time for straw decomposition, urea application provides available nitrogen for straw decomposition, irrigation and steeping field supplement water for straw decomposition, and field drying provides suitable temperature for straw decomposition. The comprehensive effect of various factors promotes the straw decomposition, improves the decomposition degree of straw before transplanting, and indirectly reduces the intensity of biogas generation in the later period after transplanting, which is beneficial to rice growth and high yield.

DETAILED DESCRIPTION OF THE EMBODIMENTS

Various exemplary embodiments of the disclosure will now be described in detail, and this detailed description should not be considered as a limitation of the disclosure, but should be understood as a more detailed description of certain aspects, characteristics and embodiments of the disclosure.

It should be understood that the terminology described in the disclosure is only for describing specific embodiments and is not used for limiting the disclosure. In addition, for the numerical range in the disclosure, it should be understood that each intermediate value between the upper limit and the lower limit of the range is also specifically disclosed. Intermediate values within any stated value or stated range, as well as each smaller range between any other stated value or intermediate values within the stated range are also included in the disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the disclosure only describes the preferred methods and materials, any methods and materials similar or equivalent to those described herein may also be used in the practice or testing of the disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present specification without departing from the scope or spirit of the disclosure. Other embodiments will be apparent to the skilled person from the description of the disclosure. The specification and embodiments of the disclosure are exemplary only.

The terms "including", "comprising", "having" and "containing" used herein are all open terms, which means including but not limited to.

The disclosure will be described in further detail with reference to specific embodiments.

Embodiment 1

Figure 1:
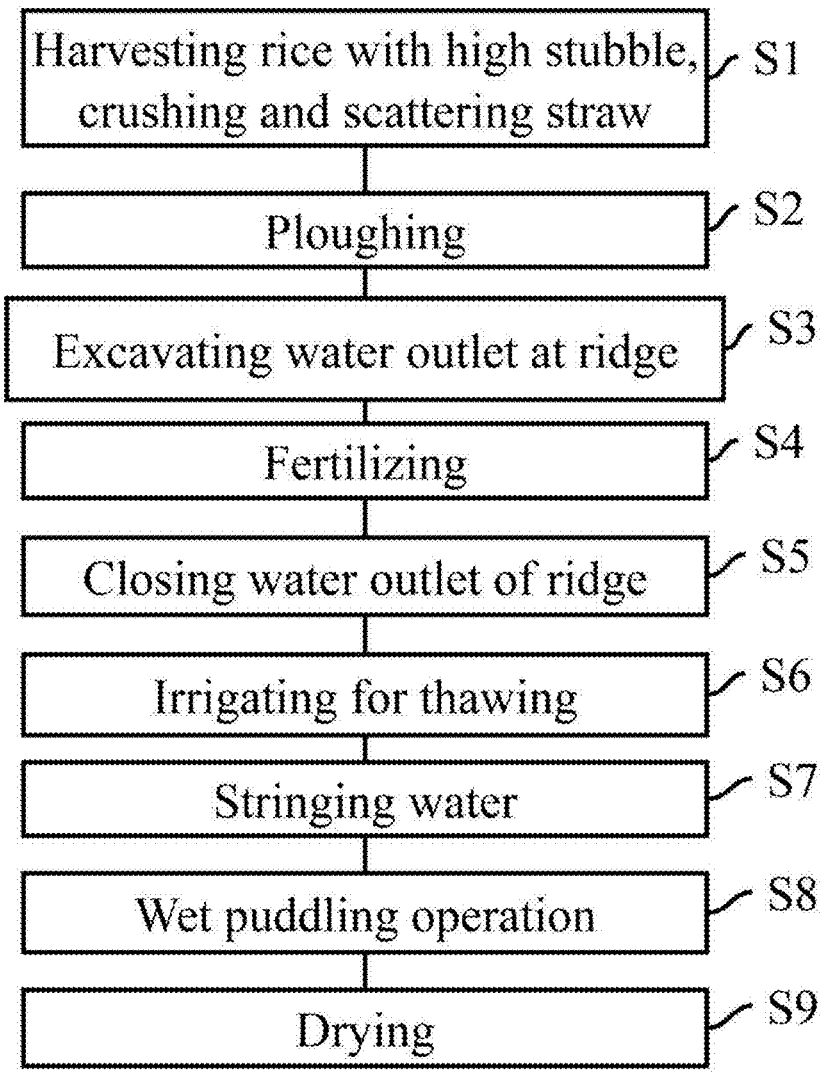
FIG. 1 is a flow chart of straw returning method through thawing and wet puddling for saline-sodic paddy fields in western Songnen plain.

Embodiment 1 was carried out from the autumn of 2021 to the autumn of 2022. The saline-sodic paddy field was located in Niuxintaobao Reed Field, Da'an City, Jilin Province, with an area of 20 hectares. The soil of 0-15 cm cultivation layer was tested and analyzed with the soil-water ratio of 1:5, and the pH was 9.52-9.85, the salt content was 2.31-2.68 gram/kilogram (g/kg), and the exchangeable sodium percentage (ESP) was 14.2%-23.7%. As shown in FIG. 1, the specific steps are as follows.

S1: rice harvesting with high stubble left and straw crushing and scattering: rice harvesting was carried out by using a full-feeding harvester combined with crushing and scattering devices. The rice did not lodge, the average stubble height was about 42 cm, the average length of crushed straw was 14 cm, and the qualified rate of straw crushing lengths was 80%. After crushing, the straw was evenly scattered on the ground, and the scattering uniformity was 80%.

S2: shallow ploughing: a 90 horsepower tractor with a driving disk plough is used for shallow ploughing, with a depth of 15 cm, a leakage ploughing rate of 5% and a re-ploughing rate of 5%.

S3: ridge excavation of water outlet: from Oct. 28 to 31, 2021, a water outlet with a width of about 50 cm was excavated at the ridge position corresponding to the low position where water easily flows between two adjacent fields, and the depth was at a same level with the field surface. The excavated soil was piled up on the ridge near the water outlet for later closure of the water outlet.

S4: application of base fertilizer and quick-acting nitrogen fertilizer: on Mar. 19-21, 2022, according to local production experience, base fertilizer $N:P_2O_5:K_2O=90$ kg/ha:100 kg/ha:110 kg/ha was applied, and at the same time, urea was added with 120 kg/ha.

S5: closing the water outlet of the ridge: the loose soil thawed on the surface near the water outlet of the ridge was excavated, and the water outlet was closed to control the water to stay in the required field.

S6: irrigating for thawing: from Apr. 8 to 12, 2022, the natural thawed depth of the soil layer reached about 8 cm, the field was irrigated, and the irrigation was stopped until the tops of the slices were submerged, and the field was steeped for 1 hour, the overall thawed depth reached about 12 cm.

S7: stringing water: the water outlet of this field was dug, so that the open water in the field was stringed into the next field, and when the proportion of the open water area in the field surface was reduced to 20%, the water outlet was closed again to stop stringing water, and meanwhile, water was diverted from the water source to irrigate and thaw the next field. The water in the last field of the day's operation was directly discharged from the drainage outlet and did not string into the next field.

S8: wet puddling, leveling and drainage: after the field was irrigated and thawed, a 90 horsepower tractor with a puddling machine was immediately used for wet puddling, and the depth of puddling operation was set to 12 cm, which was consistent with the depth of the thawed layer. At this time, the lower soil was in a frozen state, which may well support the operating machinery. Tractor wheels only made ruts with a depth of 2-3 cm when rolling the frozen soil in the lower layer, and the ruts were repeatedly rolled to form a mud layer with a depth of 2-3 cm, which was matched with 12 cm of puddling by the puddling machine to form a cultivation layer with a depth of about 15 cm. The tractor was also equipped with a leveler to even the field surface, and the field surface was observed until the straw was not obviously exposed and the height difference was not more than ⅓ decimetre, then the mechanical operation was stopped, and the drainage outlet normally matched with the field was opened to discharge the muddy water on the field surface into the drainage ditch.

S9: reconstruction of cultivation layer soil structure by drying: the field with muddy water drained was dried for 22 days, and criss-crossing cracks appeared on the field surface, and the drying depth of cultivation layer soil from the surface reached 10 cm.

Figure 2A:
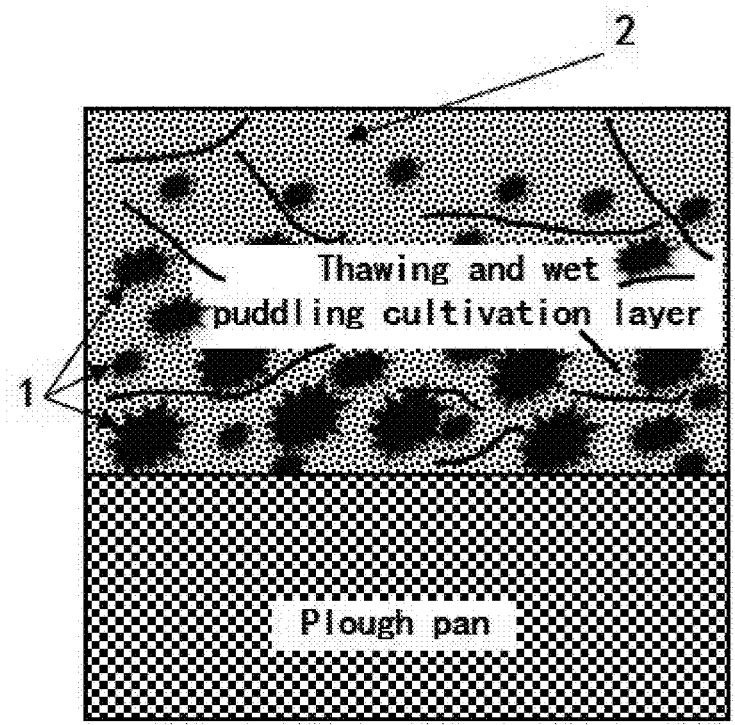
FIG. 2A shows a straw returning method of saline-sodic paddy fields through thawing and wet puddling, where 1—frozen soil blocks (with different sizes and certain levels), and 2—rice straw.

As shown in FIG. 2A, the technical effects achieved by the method of thawing and wet puddling in Embodiment 1 are as follows.

In mid-May, a 50 cm profile was dug before transplanting rice seedlings for observation and sampling analysis. It was found that 15 cm below was a solid plough pan, and the 0-15 cm cultivation layer had a good structure of "upper paste and lower loose", and the straw decomposition rate reached 30%. When transplanting rice seedlings, a rice transplanter operated smoothly, the seedlings were in lines and in rows, the missing transplanting rate was <1%, and the quality of transplanting rice seedlings was high. The field surface was observed during the peak biogas generation period, mid-June to mid-July, and no significant bubble generation was observed, indicating that no significant biogas occurred during the growing period. Table 1 shows the measured values of hydrogen sulfide content in the air from mid-June to mid-July, and the average value of four tests is about 0.10 part per million (ppm). The yield of rice harvested in autumn is 7367 kg/ha.

TABLE 1

Hydrogen sulfide content in air from mid-June to mid-July in field of Embodiment 1

| Detection date | Detection period | Hydrogen sulfide content (ppm) |
| --- | --- | --- |
| 2022 Jun. 15 | 12:00-14:00 | 0.09 |
| 2022 Jun. 25 | 12:00-14:00 | 0.11 |
| 2022 Jul. 5 | 12:00-14:00 | 0.11 |
| 2022 Jul. 15 | 12:00-14:00 | 0.10 |

Comparative Example 1

In the Comparative example 1, the straw was returned to the field by conventional spring puddling, and the implementation time was from the autumn of 2021 to the autumn of 2022. The plot was adjacent to the plot of Embodiment 1, located in Niuxintaobao Reed Field, Da'an City, Jilin Province, with an area of 1 hectare, the soil salinity was the same, the pH was 9.52-9.85, the salt content was 2.31-2.68 g/kg, and the exchangeable sodium percentage (ESP) was 14.2%-23.7%. The specific steps are as follows.

S1: rice harvesting and straw crushing and scattering: the rice was harvested by using a full-feeding harvester combined with crushing and scattering devices. The rice did not lodge, the average stubble height was about 15 cm, the average length of crushed straw was 14 cm, and the qualified rate of straw crushing lengths was 80%. After crushing, the straw was evenly scattered on the ground, and the scattering uniformity was 80%.

S2: application of base fertilizer and quick-acting nitrogen fertilizer: on April 30th, 2022, base fertilizer $N:P_2O_5:K_2O=90$ kg/ha:100 kg/ha:110 kg/ha was applied according to local production experience, and at the same time, urea was added with 120 kg/ha.

S3: rotary tillage: a 90 horsepower tractor with a rotary tiller was used for rotary tillage, and the operation depth was set to 15 cm.

S4: steeping field: after 2 days of irrigation and steeping, drainage was performed, the soil on the field surface was saturated with water, and the remaining open water area accounted for about 20% of the field surface area.

S5: puddling, leveling and drainage: on May 3, 2022, a 70 horsepower tractor with a puddling machine was used for puddling, and the operation depth was set to 15 cm, and the straw was completely pressed into the mud. The tractor was also equipped with a leveler to even the field surface, and the field surface was observed until the straw was not obviously exposed and the height difference was not more than ⅓ decimetre, then the mechanical operation was stopped. After the muddy water on the field surface has settled, the drainage outlet of the field was opened and the surface open water of the field surface was drained into the drainage ditch.

Figure 2B:
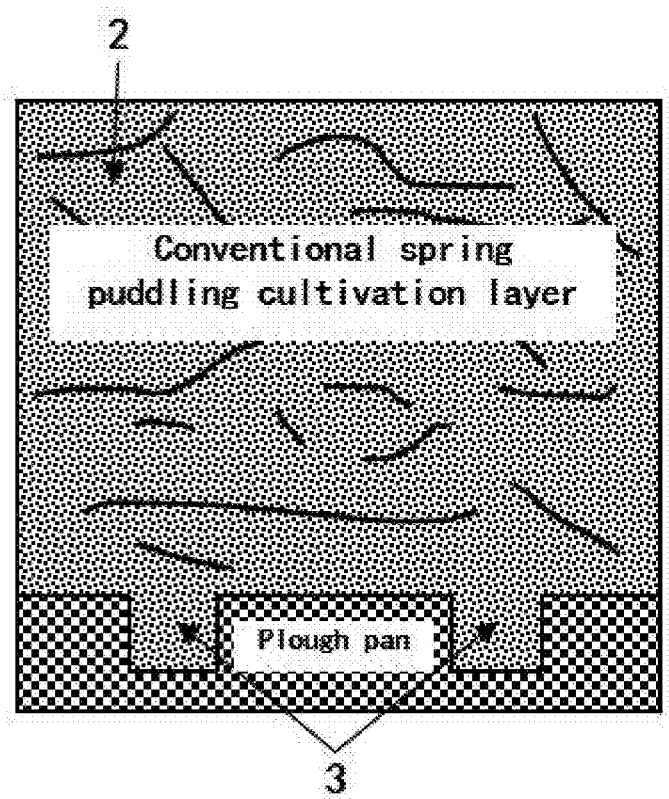
FIG. 2B shows a straw returning method of conventional spring puddling, where 2—rice straw, and 3—ruts pressed by an operating vehicle.

As shown in FIG. 2B, the technical effects of the conventional spring puddling method in Comparative example 1 are as follows.

In mid-May, a 50 cm profile was dug before transplanting rice seedings for observation and sampling analysis. It was found that the plough pan did not appear until below 28 cm, and the 0-28 cm cultivation layer was basically uniform and muddy without structure, and the straw decomposition rate was only about 6%. When transplanting rice seedlings, the rice transplanter operated unsteadily, especially in the case of deep ruts under the pressure of the puddling machine, the seedlings were not in lines and not in rows, the missing transplanting rate was about 8%, and the quality of transplanting rice seedlings was poor. The field surface was observed during the peak biogas generation period, mid-June to mid-July, and obvious bubbles were observed, indicating that there was a strong biogas generation. Table 2 shows the measured values of hydrogen sulfide content in the air from mid-June to mid-July, and the average value of four tests is about 0.16 ppm. The yield of rice harvested in autumn is 5946 kg/ha.

TABLE 2

Hydrogen sulfide content in air from mid-June to mid-July in field of Comparative example 1

| Detection date | Detection period | Hydrogen sulfide content (ppm) |
| --- | --- | --- |
| 2022 Jun. 15 | 12:00-14:00 | 0.14 |
| 2022 Jun. 25 | 12:00-14:00 | 0.18 |
| 2022 Jul. 5 | 12:00-14:00 | 0.18 |
| 2022 Jul. 15 | 12:00-14:00 | 0.15 |

Embodiment 2

Embodiment 2 was carried out from the autumn of 2022 to the autumn of 2023. The saline-sodic paddy field was located in Niuxintaobao Reed Field, Da'an City, Jilin Province, with an area of 50 hectares. The soil of 0-15 cm cultivation layer was tested and analyzed with the soil-water ratio of 1:5, with the pH of 9.15-9.62, the salt content of 1.73-2.03 g/kg and the exchangeable sodium percentage (ESP) of 12.3%-17.4%. The specific steps are as follows.

S1: rice harvesting with high stubble left and straw crushing and scattering: the rice was harvested by a full-feeding harvester combined with crushing and scattering devices. The rice did not lodge, the average stubble height was about 40 cm, the average length of crushed straw was 15 cm, and the qualified rate of straw crushing lengths was 80%. After crushing, the straw was evenly scattered on the ground, and the scattering uniformity was 80%.

S2: shallow ploughing: a 90 horsepower tractor with a driving disk plough was used for shallow ploughing, with a depth of 15 cm, a leakage ploughing rate of 5% and a re-ploughing rate of 5%.

S3: ridge excavation of water outlet: from November 2 to 5, 2022, a water outlet with a width of about 50 cm was excavated at the ridge position corresponding to the low position where water easily flows between two adjacent fields, and the depth was at a same level with the field surface. The excavated soil was piled on the ridge near the water outlet for later closure of the water outlet.

S4: application of base fertilizer and quick-acting nitrogen fertilizer: on Mar. 20-24, 2023, according to local production experience, base fertilizer $N:P_2O_5:K_2O=90$ kg/ha:100 kg/ha:110 kg/ha was applied, and at the same time, urea was added with 150 kg/ha.

S5: closing the water outlet of the ridge: the loose soil thawed on the surface near the water outlet of the ridge was excavated, and the water outlet was closed to control the water to stay in the required field.

S6: irrigating for thawing: from March 26th to Apr. 3, 2023, the natural thawed depth of the soil layer reached about 6 cm, the field was irrigated, and the irrigation was stopped until the tops of the slices were submerged, and the field was steeped for 2 hours, the overall thawed depth reached about 12 cm.

S7: stringing water: the water outlet of this field was dug, so that the open water in the field was stringed into the next field, and when the proportion of the open water area in the field surface was reduced to 20%, the water outlet was closed again to stop stringing water, and meanwhile, water was diverted from the water source to irrigate and thaw the next field. The water in the last field of the day's operation was directly discharged from the drainage outlet and did not string into the next field.

S8: wet puddling, leveling and drainage: after the field was irrigated and thawed, a 90 horsepower tractor with a puddling machine was immediately used for wet puddling, and the depth of puddling operation was set to 12 cm, which was consistent with the depth of the thawed layer. At this time, the lower soil was in a frozen state, which may well support the operating machinery. Tractor wheels only made ruts with a depth of 2-3 cm when rolling the frozen soil in the lower layer, and the ruts were repeatedly rolled to form a mud layer with a depth of 2-3 cm, which was matched with 12 cm of puddling by the puddling machine to form a cultivation layer with a depth of about 15 cm. The tractor was also equipped with a leveler to even the field surface, and the field surface was observed until the straw was not obviously exposed and the height difference was not more than ⅓ decimetre, then the mechanical operation was stopped, and the drainage outlet normally matched with the field was opened to discharge the muddy water on the field surface into the drainage ditch.

S9: reconstruction of cultivation layer soil structure by drying: the field with muddy water drained was dried for 30 days, and criss-crossing cracks appeared on the field surface, and the drying depth of cultivation layer soil from the surface reached 12 cm.

The technical effects achieved by the method of thawing and wet puddling in Embodiment 2 are as follows.

In mid-May, a 50 cm profile was dug before transplanting rice seedings for observation and sampling analysis. It was found that 15 cm below was a solid plough pan, and the 0-15 cm cultivation layer had a good structure of "upper paste and lower loose", and the straw decomposition rate reached 32%. When transplanting rice seedlings, the rice transplanter operated smoothly, the seedlings were in lines and in rows, the missing transplanting rate was <1%, and the quality of transplanting rice seedlings was high. The field surface was observed during the peak biogas generation period, mid-June to mid-July, and no significant bubble generation was observed, indicating that no significant biogas occurred during the growing period. Table 3 shows the measured values of hydrogen sulfide content in the air from mid-June to mid-July, and the average value of four tests is about 0.08 ppm. The yield of rice harvested in autumn is 8364 kg/ha.

TABLE 3

Hydrogen sulfide content in air from mid-June to mid-July in field of Embodiment 2

| Detection date | Detection period | Hydrogen sulfide content (ppm) |
| --- | --- | --- |
| 2023 Jun. 15 | 12:00-14:00 | 0.07 |
| 2023 Jun. 25 | 12:00-14:00 | 0.08 |
| 2023 Jul. 5 | 12:00-14:00 | 0.09 |
| 2023 Jul. 15 | 12:00-14:00 | 0.08 |

Comparative Example 2

In the Comparative example 2, the straw was returned to the field by conventional spring puddling, and the implementation time was from the autumn of 2022 to the autumn of 2023. The plot was adjacent to the plot of Embodiment 2, located in Niuxintaobao Reed Field, Da'an City, Jilin Province, with an area of 1 hectare, the soil salinity was the same, the pH was 9.15-9.62, the salt content was 1.73-2.03 g/kg, and the exchangeable sodium percentage (ESP) was 12.3%-17.4%. The specific steps are as follows.

S1: rice harvesting and straw crushing and scattering: the rice was harvested by using a full-feeding harvester combined with crushing and scattering devices. The rice did not lodge, the average stubble height was about 15 cm, the average length of crushed straw was 15 cm, and the qualified rate of the straw crushing length was 80%. After crushing, the straw was evenly scattered on the ground, and the scattering uniformity was 80%.

S2: application of base fertilizer and quick-acting nitrogen fertilizer: on Apr. 29, 2023, base fertilizer $N:P_2O_5:K_2O=90$ kg/ha:100 kg/ha:110 kg/ha was applied according to local production experience, and at the same time, urea was added with 150 kg/ha.

S3: rotary tillage: a 90 horsepower tractor with a rotary tiller was used for rotary tillage, and the operation depth was set to 15 cm.

S4: steeping field: after 2 days of irrigation and steeping, drainage was performed, the soil on the field surface was saturated with water, and the remaining open water area accounted for about 20% of the field surface area.

S5: puddling, leveling and drainage: on May 3, 2023, a 70 horsepower tractor with a puddling machine was used for puddling, and the operation depth was set to 15 cm, and the straw was completely pressed into the mud. The tractor was also equipped with a leveler to even the field surface, and the field surface was observed until the straw was not obviously exposed and the height difference was not more than ⅓ decimetre, then the mechanical operation was stopped. After the muddy water on the field surface has settled, the drainage outlet of the field was opened and the surface open water of the field surface was drained into the drainage ditch.

The technical effects of the conventional spring puddling method in Comparative example 2 are as follows.

In mid-May, a 50 cm profile was dug before transplanting rice seedings for observation and sampling analysis. It was found that the plough pan appeared at 25 cm, and the 0-25 cm cultivation layer was basically uniform and muddy without structure, and the straw decomposition rate was only about 8%. When transplanting rice seedlings, the rice transplanter operated unsteadily, especially in the case of deep ruts under the pressure of the puddling machine, the seedlings were not in lines and not in rows, the missing transplanting rate was about 5%, and the quality of transplanting rice seedlings was poor. The field surface was observed during the peak biogas generation period, mid-June to mid-July, and obvious bubbles were found, indicating that there was a strong biogas generation. Table 4 shows the measured values of hydrogen sulfide content in the air from mid-June to mid-July, and the average value of four tests is about 0.13 ppm. The yield of rice harvested in autumn is 7361 kg/ha.

TABLE 4

| | Hydrogen sulfide content in air from mid-June to mid-July in field of Comparative example 2 | |
|---|---|---|
| Detection date | Detection period | Hydrogen sulfide content (ppm) |
| 2023 Jun. 15 | 12:00-14:00 | 0.12 |
| 2023 Jun. 25 | 12:00-14:00 | 0.15 |
| 2023 Jul. 5 | 12:00-14:00 | 0.14 |
| 2023 Jul. 15 | 12:00-14:00 | 0.12 |

The implementation results show that the saline-sodic paddy field with pH of 9.15-9.85, salt content of 1.73-2.68 g/kg and an exchangeable sodium percentage (ESP) of 12.3%-23.7% has a good structure of "upper paste and lower loose" at the 0-15 cm cultivation layer, and the straw decomposition rate may reach 30%-32% before transplanting rice seedlings, the rice transplanter operates smoothly, the seedlings are in lines and in rows, the missing transplanting rate is <1%, the quality of transplanting rice seedlings is high, there is no obvious biogas generation during the growing period, and the rice yield reaches 7367-8364 kg/ha.

The above-mentioned embodiments only describe the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A straw returning method through thawing and wet puddling for saline-sodic paddy fields in western Songnen plain, comprising following steps:
    (1) harvesting rice with a high stubble left having a height of 30-40 cm under a condition of ensuring full harvest of rice ears, and crushing and scattering the straw on a ground, wherein an average length of the crushed straw after the crushing is ≤15 cm, a qualified rate of straw crushing lengths defined as ≥80% of straw pieces meeting the ≤15 cm length is ≥80%, and uniformity of straw scattering defined as even distribution across ≥80% of the field surface is ≥80%;
    (2) ploughing at a surface depth of 14-16 cm, breaking soil capillary pores and inhibiting salt accumulation, wherein a ploughing depth matches a cultivation layer depth of a saline-sodic paddy field, and a leakage ploughing rate defined as a percentage of unploughed field surface areas is ≤5%, and a re-ploughing rate defined as a percentage of overlapping plough passes is ≤5%;
    (3) excavating a water outlet at a ridge located at a topographic low point between two adjacent fields, wherein a depth is at a same level with a field surface, and excavated soil is piled adjacent to the water outlet for later closure of the water outlet;
    (4) fertilizing, wherein fertilizers applied in a fertilizing step comprise base fertilizer and urea;
    (5) closing the water outlet of the ridge: excavating loose soil thawed on a surface near the water outlet of the ridge, and closing the water outlet;
    (6) irrigating for thawing during March 26 to April 15, when a natural thawed depth of a soil layer reaches 6-8 cm, irrigating the field of step (3) until tops of soil slices produced during ploughing are submerged, and steeping the field for 1-2 hours; and promoting a shallow ploughed slice to thaw through a heat exchange between soil and water, wherein an overall thawed depth reaches 11-13 cm, and meanwhile frozen soil blocks are retained;
    (7) stringing water: digging the water outlet of the field buried in step (5), stringing open water in the field into a next field; when an open water area on the field surface accounts for no more than 20% of the total current field surface area, closing the water outlet again to stop stringing water, and meanwhile, diverting water from a water source to irrigate and thaw the next field; and when the field is a last field planned to be implemented on a same day, directly discharging the water of the field to a ditch through a drainage outlet, and completely draining water overnight;
    (8) wet puddling operation: after the field of step (6) is thawed, carrying out the wet puddling operation, wherein an operation depth of 11-13 cm is consistent with a depth of a thawed layer, and at this time, lower soil is in a frozen state to provide structural support for operating machinery, wheels roll frozen soil at a lower layer to form ruts with a depth of 2-3 cm, and a mud layer of 2-3 cm is formed by rolling repeatedly to match with 11-13 cm of puddling by a puddling machine thereby forming a cultivation layer with a depth of about 15 cm; and
    (9) drying, wherein a drying duration is not less than 20 days, a soil drying depth after the drying is not less than 10 cm, the frozen soil blocks gradually thaw and dry, retaining internal pore structures and forming staggered pores distributed in the cultivation layer soil, and the frozen soil blocks retain internal pore structures, and the frozen soil blocks are staggered, promoting formation of soil pores distributed in the cultivation layer; and improvement of water permeability of the cultivation layer soil relative to conventional spring puddling promotes dissolution of salts in soil into water, thus accelerating salt discharge of the saline-sodic soil, and improvement of air permeability of the cultivation layer soil relative to conventional spring puddling promotes a gas exchange between the soil and atmosphere, thus inhibiting biogas generation and accelerating discharge of harmful gases.

* * * * *